(12) United States Patent
Wilk et al.

(10) Patent No.: US 11,097,489 B2
(45) Date of Patent: Aug. 24, 2021

(54) METHODS OF CONTROLLING 3D PRINTING PROCESSES

(71) Applicants: Krzysztof Wilk, Myslowice (PL); Mateusz Wrobel, Bielsko-Biala (PL); Kamil Nowoczek, Drogomyśl (PL); Szymon Kostrzewa, Belsk Duży (PL); Krzysztof Roguski, Warsaw (PL)

(72) Inventors: Krzysztof Wilk, Myslowice (PL); Mateusz Wrobel, Bielsko-Biala (PL); Kamil Nowoczek, Drogomyśl (PL); Szymon Kostrzewa, Belsk Duży (PL); Krzysztof Roguski, Warsaw (PL)

( * ) Notice: Subject to any disclaimer, the term of this patent is extended or adjusted under 35 U.S.C. 154(b) by 59 days.

(21) Appl. No.: 16/509,785

(22) Filed: Jul. 12, 2019

(65) Prior Publication Data

US 2021/0008804 A1   Jan. 14, 2021

(51) Int. Cl.

| | | |
|---|---|---|
| *B29C 64/393* | (2017.01) | |
| *G05B 19/4097* | (2006.01) | |
| *G06F 21/60* | (2013.01) | |
| *B33Y 10/00* | (2015.01) | |
| *B33Y 50/02* | (2015.01) | |
| *B29C 64/112* | (2017.01) | |

(52) U.S. Cl.
CPC .......... *B29C 64/393* (2017.08); *B33Y 10/00* (2014.12); *B33Y 50/02* (2014.12); *G05B 19/4097* (2013.01); *G06F 21/602* (2013.01); *G06F 21/608* (2013.01); *B29C 64/112* (2017.08); *G05B 2219/49007* (2013.01)

(58) Field of Classification Search
CPC ... B29C 64/393; B29C 64/112; B29C 64/386; B33Y 10/00; B33Y 50/02; G05B 19/4097; G05B 2219/49007; G05B 19/4099; G05B 19/386; G05B 2219/33225; G06F 21/602; G06F 21/608; G06Q 30/0621; G06Q 50/10; Y02P 90/02
See application file for complete search history.

(56) References Cited

U.S. PATENT DOCUMENTS

| | | | |
|---|---|---|---|
| 9,868,257 B1 * | 1/2018 | Strand | B29C 64/386 |
| 2018/0229448 A1 * | 8/2018 | Bastian | B29C 64/40 |
| 2020/0324481 A1 * | 10/2020 | Sayers | B33Y 50/00 |

FOREIGN PATENT DOCUMENTS

WO   WO-2014193311 A1 * 12/2014   ......... G05B 19/4099

* cited by examiner

*Primary Examiner* — Thomas C Lee
*Assistant Examiner* — Ameir Myers

(57) ABSTRACT

Methods and systems for controlling a three-dimensional (3D) printing process are disclosed. In such methods, for example, encrypted printing parameters for a specific printing material are recorded onto a digital tag. The digital tag is then applied to a cartridge that holds the printing material, which is subsequently inserted into a 3D printer. The printer is then instructed to decrypt the encrypted printing parameters to produce a set of decrypted printing parameters. A set of spatial model specifications are also provided to the 3D printer. The 3D printer is then instructed to generate printing machine code based on the decrypted printing parameters and spatial model specifications. Finally, the 3D printer is instructed to manufacture a physical model based on the printing machine code.

8 Claims, 4 Drawing Sheets

METHODS OF CONTROLLING 3D PRINTING PROCESSES

FIELD OF THE INVENTION

The field of the present invention relates to systems and methods for three-dimensional (3D) printing and, more particularly, to systems and methods for delivering and communicating printing parameters for specific 3D printing materials, in a manner that preserves the confidential and proprietary nature of such parameters.

BACKGROUND OF THE INVENTION

Methods of three-dimensional (3D) spatial printing may utilize various types of materials (substrates), with each material having its own unique physicochemical properties. The physicochemical properties of a material constitute important information required by a 3D printer, for successfully manufacturing/printing a desired physical model. Such physicochemical properties are typically reflected within unique machine codes, which define—along with an operator's spatial model—the specific printing parameters for the 3D printer. Such machine codes are typically produced by a spatial printer driver/controller, which may exist within the 3D printer (or, in some cases, within an external computer that is operably connected to the 3D printer).

The printing parameters that apply to a particular material are developed through considerable effort, time, and monetary resources—and, therefore, are often considered highly confidential and proprietary by the developers of such parameters (this is particularly the case for specialty and non-standard materials that are used in 3D printing applications). In the field of 3D printing, the applicable set of printing parameters are often supplied along with the material—and are usually accompanied with software that is configured to generate the necessary machine code based on the printing parameters. In some cases, however, the software and printing parameters are susceptible to being reverse engineered by competitors or other parties, which compromises the confidential and proprietary nature of the specific printing parameters (which, as mentioned above, are originally derived through considerable effort, time, and monetary resources).

There have been certain attempts in the field to prevent others from reverse engineering the specific printing parameters that apply to a 3D printing material. For example, some manufacturers have distributed printing materials on reels (or in containers), along with a microchip that contains limited forms of operational parameters, which the 3D spatial printer is capable of reading. Such operational parameters include certain basic information about the materials (e.g., material name, color, weight, etc.), along with certain basic information that is relevant to the printing process (e.g., required temperatures, loading speeds, etc.). However, such basic information is not sufficient to be used as a printing profile (i.e., the detailed printing parameters described herein). In addition, when this approach is employed, it is not possible to print from such materials that do not contain the microchip (which consumers do not like). In other cases, printing materials may be provided on reels that contain a radio-frequency identification (RFID) tag, which is configured to communicate certain limited and decrypted forms of operational parameters to a 3D spatial printer. Such methods are unfavorable as well, for a variety of reasons.

In view of the foregoing, there is a continuing need in the marketplace for improved systems and methods for delivering and communicating full printing parameters for specific 3D printing materials, in a manner that preserves the confidential and proprietary nature of such parameters. As the following will demonstrate, the systems and methods of the present invention address such needs in the marketplace.

SUMMARY OF THE INVENTION

The present invention encompasses improved systems and methods for delivering and communicating printing parameters for specific 3D printing materials, in a manner that preserves the confidential and proprietary nature of such parameters.

According to certain aspects of the present invention, such methods entail recording encrypted printing parameters for a specific printing material onto a digital tag. The digital tag is then applied to a cartridge that holds the printing material, which is subsequently inserted into a 3D printer. The printer is then instructed to decrypt the encrypted printing parameters to produce a set of decrypted printing parameters. A set of spatial model specifications are also provided to the 3D printer, e.g., through a user interface of the 3D printer. The 3D printer is then instructed to generate printing machine code based on the decrypted printing parameters and spatial model specifications. Finally, the 3D printer is instructed to manufacture a physical model based on the printing machine code.

According to other aspects of the invention, such methods are performed by first recording encrypted communication data onto a digital tag. In such embodiments, the communication data are configured to enable a 3D printer to connect and communicate with an external server. The digital tag is applied to a cartridge that holds printing material, which is subsequently inserted into a 3D printer. Upon receipt of such communication data, the 3D printer is instructed to connect and communicate with the external server and to download a set of encrypted printing parameters for the printing material. According to such embodiments, the invention further provides that a controller housed within the 3D printer is then instructed to decrypt the encrypted printing parameters to produce a set of decrypted printing parameters (a set of spatial model specifications are also provided to the 3D printer, e.g., through a user interface of the 3D printer). Next, the controller of the 3D printer is instructed to generate printing machine code based on the decrypted printing parameters and spatial model specifications. Finally, the 3D printer is instructed to manufacture the desired physical model based on the printing machine code.

According to additional and related aspects of the invention, such methods are performed by first recording encrypted communication data onto a digital tag, with the communication data being configured to enable a 3D printer to connect and communicate with an external server (as in the embodiment described above). The digital tag is applied to a cartridge that holds printing material, which is then inserted into a 3D printer. Upon inserting the cartridge, the 3D printer is instructed to connect and communicate with the external server—and to instruct the external server to transfer a set of encrypted printing parameters for the applicable printing material to an external computer. The invention provides that a controller housed within the external computer is then instructed to decrypt the encrypted printing parameters to produce a set of decrypted printing parameters. The external computer is also provided with a set of spatial model specifications, e.g., by an operator of the 3D printer. According to these embodiments, the controller of the external computer may then be instructed to generate printing machine code based on the decrypted printing parameters and spatial model specifications. The external computer is then instructed to transfer the printing machine code to the 3D printer through the external server, such that the 3D printer is able to manufacture a physical model based on the printing machine code.

According to yet further aspects of the invention, systems for delivering and communicating printing parameters for specific 3D printing materials are provided—in a manner that preserves the confidential and proprietary nature of such parameters. More specifically, in certain embodiments, the systems will generally comprise the digital tags, cartridges, 3D printers, and controllers described herein (with such controllers being housed within the 3D printer or an external computer). In other embodiments, the systems will generally comprise the digital tags, cartridges, 3D printers, controllers, and external servers described herein. According to yet further embodiments, the systems will generally comprise the digital tags, cartridges, 3D printers, controllers, external servers, and external computers described herein.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

According to certain preferred embodiments of the present invention, systems and methods for delivering and communicating printing parameters for specific 3D printing materials are provided, with the systems and methods being particularly configured to deliver such information in a manner that preserves the confidential and proprietary nature of such printing parameters. As explained above, the phrase "printing parameters" refers to specific parameters and conditions to be used by a 3D printer during operation, which are optimized for the physicochemical properties of the printing material to be used. Non-limiting examples of such printing parameters may include printing temperatures at both the nozzle and build platform, the build speed, cooling fan speeds, and others. Non-limiting examples of printing materials include PC; PA; PEI; PAEK; ABS; PLA; materials consisting of glass, carbon, or other fibers; materials consisting of wood, metals, ceramics, and other fillings; materials that are conductive, flexible, or soluble; and many other types of specialty and non-standard printing materials. The systems and methods of the present invention may be used with conventional and commercially-available 3D printers.

Figure 1:
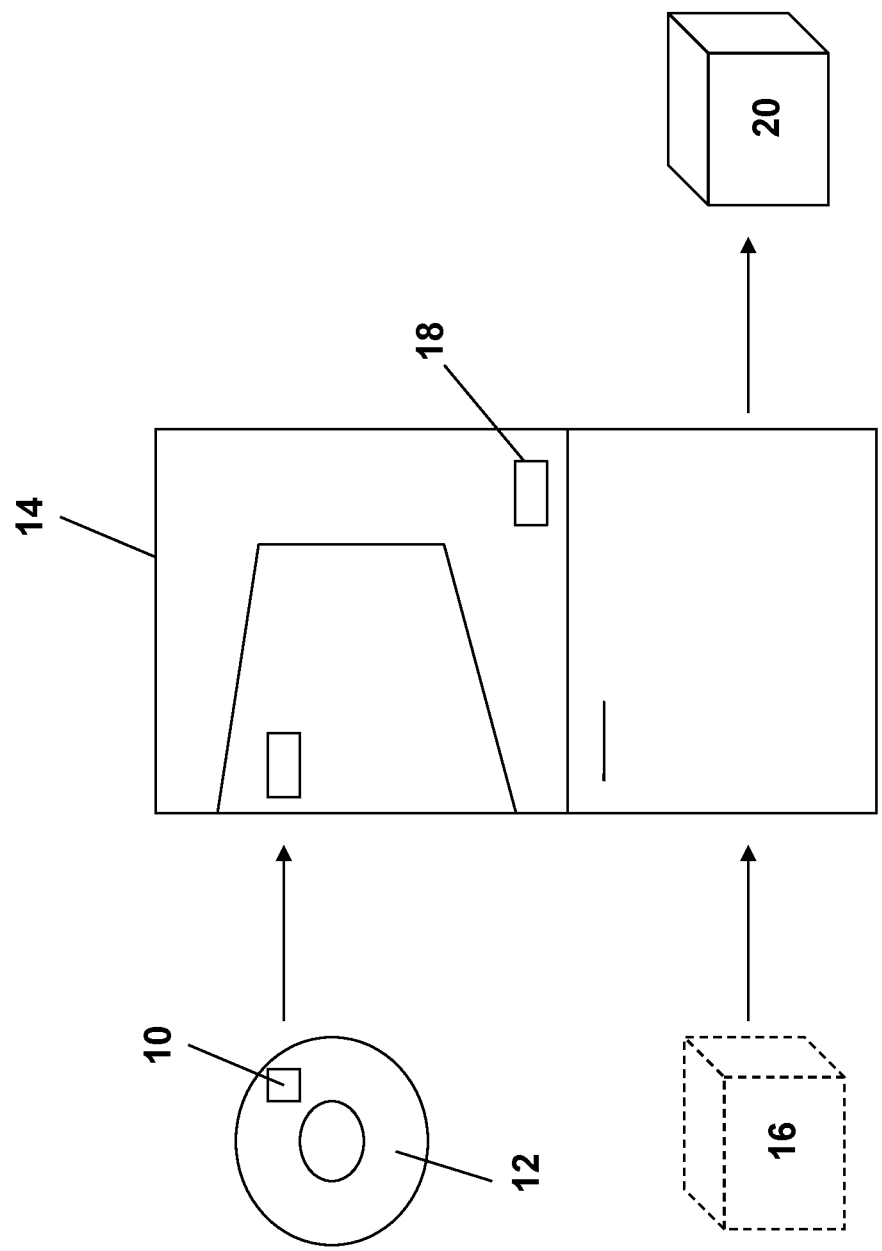
FIG. 1 is a diagram illustrating a first embodiment of the present invention, in which a controller housed within a 3D printer is responsible for generating machine code based upon decrypted printing parameters (derived from a digital tag applied to a print material cartridge) and a desired spatial model.

Referring now to FIG. 1, according to certain embodiments, the systems and methods of the present invention provide that a set of machine codes may be produced within the 3D printer itself. More particularly, in such embodiments, the applicable printing parameters are recorded (in an encrypted form) onto a digital tag 10, which is configured to be applied onto the cartridge 12 that holds the printing material. The invention provides that the digital tag 10 may be applied to the cartridge 12 of the printing material via adhesives, magnets, mechanical attachments, or other suitable means. As used herein, the term "cartridge" should be interpreted to include a conventional printing material cartridge, a reel holding the printing material, a spool holding the printing material, or other containers that hold printing material that are adapted to be inserted into a 3D printer and used for 3D printing applications.

The digital tag 10—which stores the encrypted printing parameters in this embodiment—may consist of a passive radio identification tag or microchip. The invention provides that various types of encryption may be employed in the present invention, to protect the contents of the printing parameters. Non-limiting examples of currently-available forms of such encryption may include the Data Encryption Standard (DES), TripleDES, RSA, Advanced Encryption Standard (AES), Twofish, or others.

The invention provides that after the cartridge 12 is loaded into the 3D printer 14, using a reader housed within the printer 14, the printing parameters are decrypted and communicated to a controller 18 of the 3D printer. The invention provides that an operator's desired spatial model 16 is also communicated to the controller 18, such as through a user interface of the 3D printer. The spatial model 16 will include data and measurements (in a form that may be interpreted by the controller 18) that reflect the desired three-dimensional shape and dimensions of the physical object (the desired physical model 20) to be printed/manufactured. The invention provides that the controller 18 is configured to subsequently generate printing machine code based upon the printing parameters and spatial model 16. Once the machine code has been generated, the printer driver of the 3D printer may be operated to manufacture/print the desired physical model 20.

Figure 2:
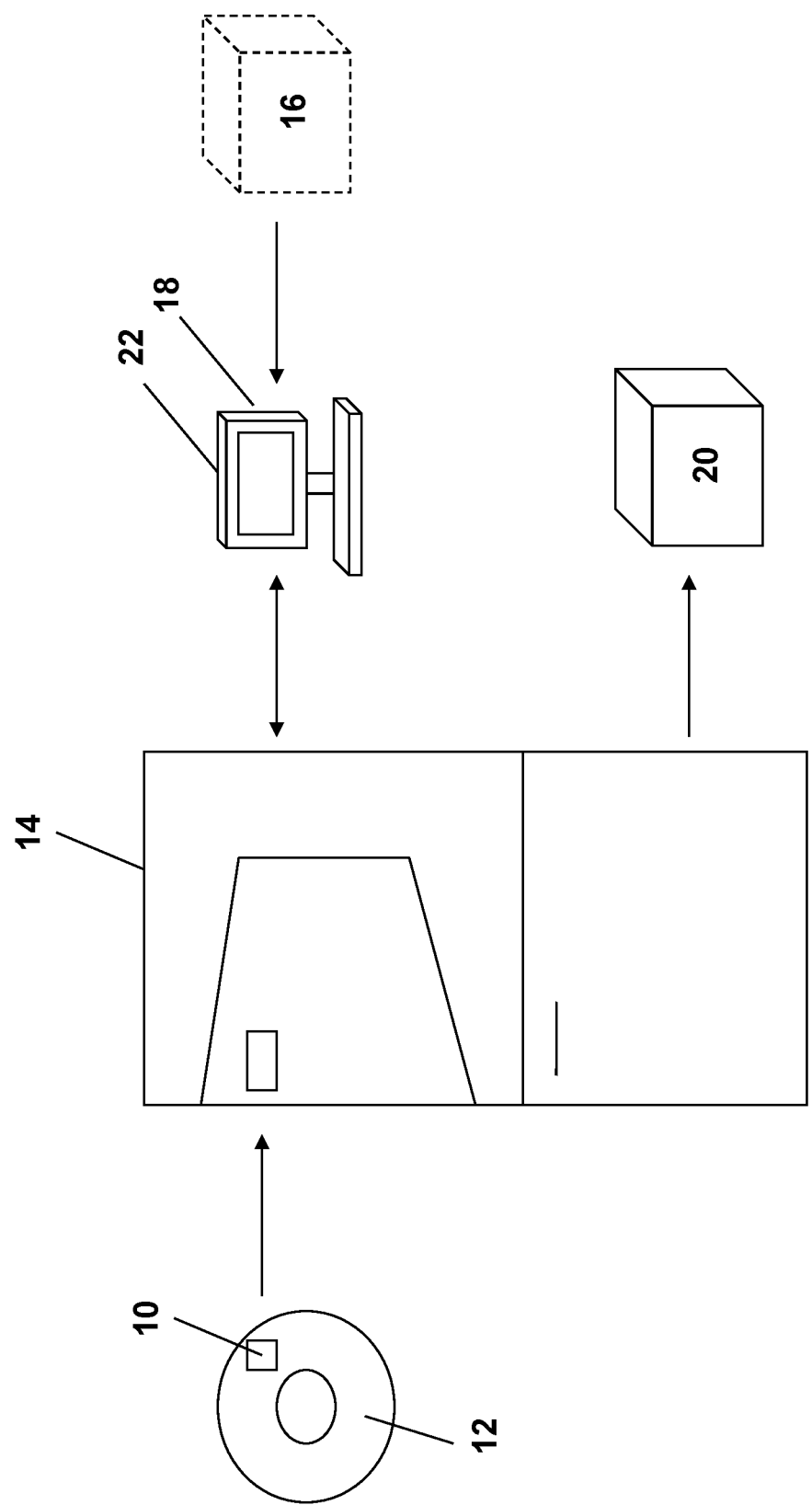
FIG. 2 is a diagram illustrating a second embodiment of the present invention, in which a controller housed within an external computer is responsible for generating machine code based upon decrypted printing parameters (derived from a digital tag applied to a print material cartridge) and a desired spatial model.

Referring now to FIG. 2, in additional embodiments of the present invention, the printing machine code may be produced within the external computer 22. More particularly, in such embodiments, the controller 18 that is configured to generate machine code, based on the supplied printing parameters and desired spatial model 16, may be housed within an external computer 22 that is operably connected and configured to communicate with the 3D printer 14, e.g., through hard wire or wireless network connections. In these embodiments, after the printing parameters are read and extracted from the digital tag 10 that is affixed to the cartridge 12 by the 3D printer 14, the printing parameters are communicated to the external computer 22, which also receives the applicable specifications for the spatial model 16 (e.g., the specifications for the spatial model 16 may be provided directly to the external computer 22 by an operator of the system). The controller 18 housed within the external computer 22 then decrypts the printing parameters and thereafter produces the applicable machine code, which is then communicated back to the 3D printer 14, such that the 3D printer 14 is then enabled to manufacture/print the desired physical model 20, as instructed by an operator.

Figure 3:
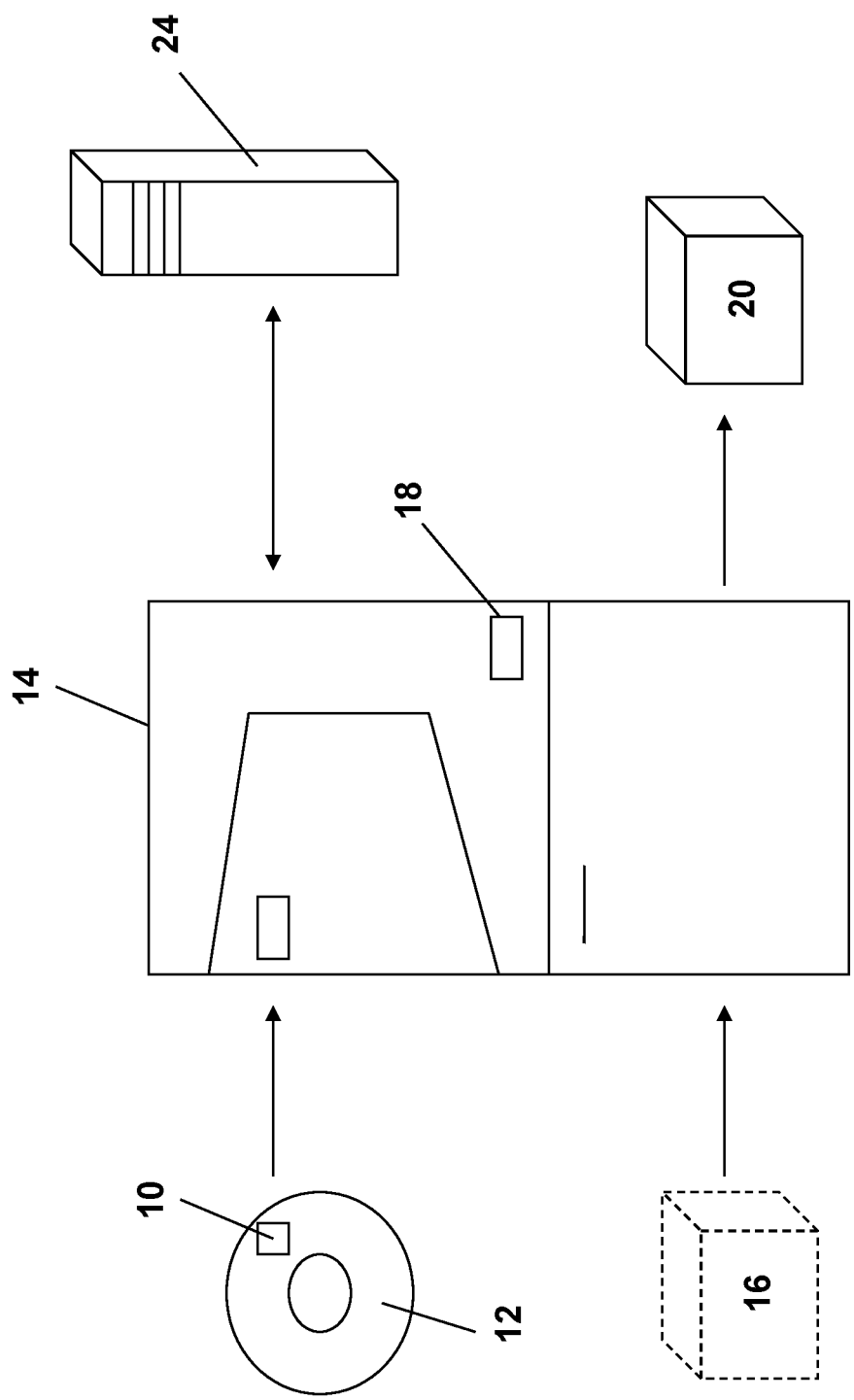
FIG. 3 is a diagram illustrating a third embodiment of the present invention, in which printing parameters are downloaded from an external server, such that a controller housed within a 3D printer is able to generate machine code based upon the decrypted printing parameters and a desired spatial model.

Referring now to FIG. 3, according to further embodiments of the present invention, the applicable printing parameters are housed (in an encrypted format) within an external server 24. As used herein, the term "server" may include a dedicated server (or set of servers) or, alternatively, may include server space within a cloud server platform. In such embodiments, a set of communication data are recorded (in an encrypted form) onto the digital tag 10, which is applied to the material cartridge 12. The communication data are configured to enable the printer 14 to connect and communicate with the external server 24. As such, after the cartridge 12 is loaded into the 3D spatial printer 14, the printer 14 connects with the external server 24 and downloads the applicable printing parameters (which are subsequently read and decrypted by the controller 18 housed within the printer 14). In addition, the invention provides that the applicable specifications for the spatial model 16 are also provided to the controller 18 (e.g., through a user interface of the 3D printer 14). At this point, the controller 18 has the necessary information to then generate the applicable machine code, which is then used by the printer 14 to manufacture/print the desired physical model 20.

Figure 4:
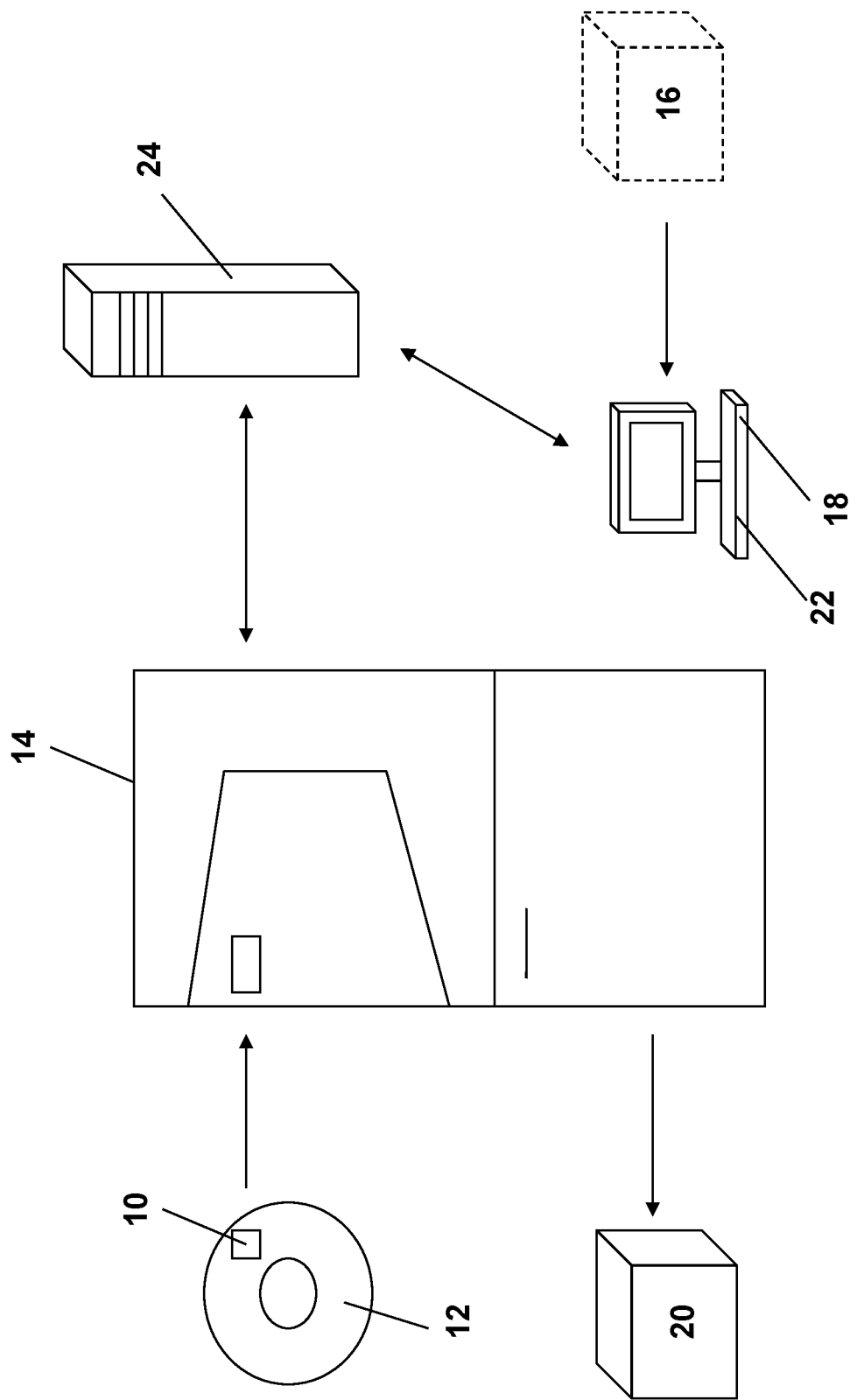
FIG. 4 is a diagram illustrating a fourth embodiment of the present invention, in which a controller housed within an external computer is responsible for generating machine code based upon a desired spatial model and decrypted printing parameters—which are originally housed within an external server that is operably connected to the external computer.

Referring now to FIG. 4, according to certain related embodiments of the present invention, an external computer 22 may house the controller 18 described herein. As with the embodiment described above, a set of communication data are recorded (in an encrypted form) onto the digital tag 10 (which is applied to the material cartridge 12), with the communication data being configured to enable the printer 14 to connect and communicate with the external server 24. In such embodiments, after the cartridge 12 is loaded into the 3D spatial printer 14, the printer 14 connects with the external server 24 and instructs the server 24 to communicate and transfer the applicable encrypted printing parameters to the external computer 22. In such embodiments, the spatial model 16 specifications are also provided to the external computer 22 (e.g., directly by an operator of the system). The invention provides that the controller 18 within the external computer 22 is then configured to decrypt the printing parameters, which are used (along with the spatial model 16 specifications) to generate the applicable machine code. In such embodiments, the machine code is subsequently delivered to the printer 14 via the external server 24, such that the printer 14 is able to manufacture/print the desired physical model 20.

The invention provides that the various steps of the methods described herein may be carried out through operator instructions—which may be effectuated through user interfaces of the 3D printer 14 and/or external computers 22 described herein—whereas other steps may be carried out automatically (through instructions initiated by the system itself).

In addition to the methods described herein, the invention further encompasses systems for delivering and communicating printing parameters for specific 3D printing materials, in a manner that preserves the confidential and proprietary nature of such parameters. More specifically, in certain embodiments, the systems will generally comprise the digital tags, cartridges, 3D printers, and controllers described herein (which are either housed within the 3D printer or an external computer). In other embodiments, the systems will generally comprise the digital tags, cartridges, 3D printers, controllers, and external servers described herein. According to yet further embodiments, the systems will generally comprise the digital tags, cartridges, 3D printers, controllers, external servers, and external computers described herein.

The systems and methods of the present invention provide many advantages over the prior art. In particular, the systems and methods of the present invention provide an improved means for delivering and communicating printing parameters for specific 3D printing materials, in a manner that preserves the confidential and proprietary nature of such parameters. In addition, when using the systems and methods described herein, the printing parameters are not embodied within the software that is required to generate machine code—which is preferred for a variety of reasons. Still further, the systems and methods of the present invention allow the printing parameters to be encrypted, thus providing another means for ensuring that such printing parameters are not reverse engineered and/or misappropriated.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A method for controlling a three-dimensional (3D) printing process, which comprises:
   (a) recording encrypted printing parameters for a printing material onto a digital tag, wherein the printing parameters consist of printing conditions that are optimized for physicochemical properties of the printing material;
   (b) applying the digital tag to a cartridge that holds the printing material;
   (c) inserting the cartridge into a 3D printer, whereupon the 3D printer is instructed to decrypt the encrypted printing parameters to produce a set of decrypted printing parameters;
   (d) providing the 3D printer with a set of spatial model specifications through a user interface of the 3D printer;
   (e) instructing the 3D printer to generate printing machine code based on the decrypted printing parameters and spatial model specifications; and
   (f) instructing the 3D printer to manufacture a physical model based on the printing machine code.

2. The method of claim 1, wherein a controller is responsible for decrypting the encrypted printing parameters to produce the set of decrypted printing parameters.

3. The method of claim 2, wherein the controller is located (a) within the 3D printer or (b) within an external computer that is operably connected to the 3D printer.

4. The method of claim 3, wherein the digital tag consists of a passive radio identification tag or a microchip.

5. A method for controlling a three-dimensional (3D) printing process, which comprises:
   (a) recording encrypted communication data onto a digital tag, wherein the communication data are configured to enable a 3D printer to connect and communicate with an external server;
   (b) applying the digital tag to a cartridge that holds printing material;
   (c) inserting the cartridge into a 3D printer, whereupon the 3D printer is instructed to connect and communicate with the external server and download a set of encrypted printing parameters for the printing material, wherein the encrypted printing parameters consist of printing conditions that are optimized for physicochemical properties of the printing material;
   (d) instructing a controller housed within the 3D printer to decrypt the encrypted printing parameters to produce a set of decrypted printing parameters;
   (e) providing the 3D printer with a set of spatial model specifications through a user interface of the 3D printer;
   (f) instructing the controller of the 3D printer to generate printing machine code based on the decrypted printing parameters and spatial model specifications; and
   (g) instructing the 3D printer to manufacture a physical model based on the printing machine code.

6. The method of claim 5, wherein the digital tag consists of a passive radio identification tag or a microchip.

7. A method for controlling a three-dimensional (3D) printing process, which comprises:
   (a) recording encrypted communication data onto a digital tag, wherein the communication data are configured to enable a 3D printer to connect and communicate with an external server;
   (b) applying the digital tag to a cartridge that holds printing material;
   (c) inserting the cartridge into a 3D printer, whereupon the 3D printer is instructed to connect and communicate with the external server and instruct the external server to transfer a set of encrypted printing parameters for the printing material to an external computer, wherein the encrypted printing parameters consist of printing conditions that are optimized for physicochemical properties of the printing material;
   (d) instructing a controller housed within the external computer to decrypt the encrypted printing parameters to produce a set of decrypted printing parameters;
   (e) providing the external computer with a set of spatial model specifications through a user interface of the external computer;
   (f) instructing the controller of the external computer to generate printing machine code based on the decrypted printing parameters and spatial model specifications;
   (g) instructing the external computer to transfer the printing machine code to the 3D printer through the external server; and
   (h) instructing the 3D printer to manufacture a physical model based on the printing machine code.

8. The method of claim 7, wherein the digital tag consists of a passive radio identification tag or a microchip.

\* \* \* \* \*